United States Patent
Sung

(10) Patent No.: US 9,747,774 B1
(45) Date of Patent: Aug. 29, 2017

(54) FALL DETECTION SYSTEM AND METHOD THEREOF

(71) Applicant: EcoReco Global Corporation, Victoria, Mahe (SC)

(72) Inventor: Jay Sung, Mahe (SC)

(73) Assignee: ECORECO GLOBAL CORPORATION, Victoria, Mahe (SC)

( * ) Notice: Subject to any disclaimer, the term of this patent is extended or adjusted under 35 U.S.C. 154(b) by 0 days.

(21) Appl. No.: 15/184,931

(22) Filed: Jun. 16, 2016

(51) Int. Cl.
  *G08B 21/00* (2006.01)
  *G08B 21/04* (2006.01)
  *B60R 21/00* (2006.01)

(52) U.S. Cl.
  CPC .. *G08B 21/0461* (2013.01); *B60R 2021/0027* (2013.01)

(58) Field of Classification Search
  CPC .. A61B 5/1117; B62K 11/007; G08B 21/0461
  See application file for complete search history.

(56) References Cited

U.S. PATENT DOCUMENTS

2009/0254003 A1* 10/2009 Buckman ............... A61B 5/1117
  600/595
2013/0238231 A1* 9/2013 Chen .................... B62K 11/007
  701/124

\* cited by examiner

*Primary Examiner* — Andrew Bee
(74) *Attorney, Agent, or Firm* — Muncy, Geissler, Olds & Lowe, P.C.

(57) ABSTRACT

A fall detection system for detecting falls off a mobility vehicle includes a first sensor, a second sensor, and a processor disposed in the mobility vehicle or a mobile device. The first sensor is disposed on the mobility vehicle and generates a first sensor reading corresponding to movement of the mobility vehicle. The second sensor is disposed in the mobile device and generates a second sensor reading corresponding to movement of the mobile device. The processor is disposed in the mobility vehicle or the second vehicle, wherein the processor performs the following: a) retrieving the first sensor reading and the second sensor reading; b) determining a correlation between the first sensor reading and the second sensor reading and entering into a first mode if the correlation exceeds a minimum correlation threshold, otherwise repeating step a) after a first time period if the correlation is below the minimum correlation threshold; c) determining the correlation between the first sensor reading and the second sensor reading after a second time period, and entering into a second mode if the correlation is below the minimum correlation threshold; d) generating a fall detected signal if the correlation between the first sensor reading and the second sensor reading after a third time period correspond respectively to stationary movement of the mobility vehicle and the mobile device.

18 Claims, 8 Drawing Sheets

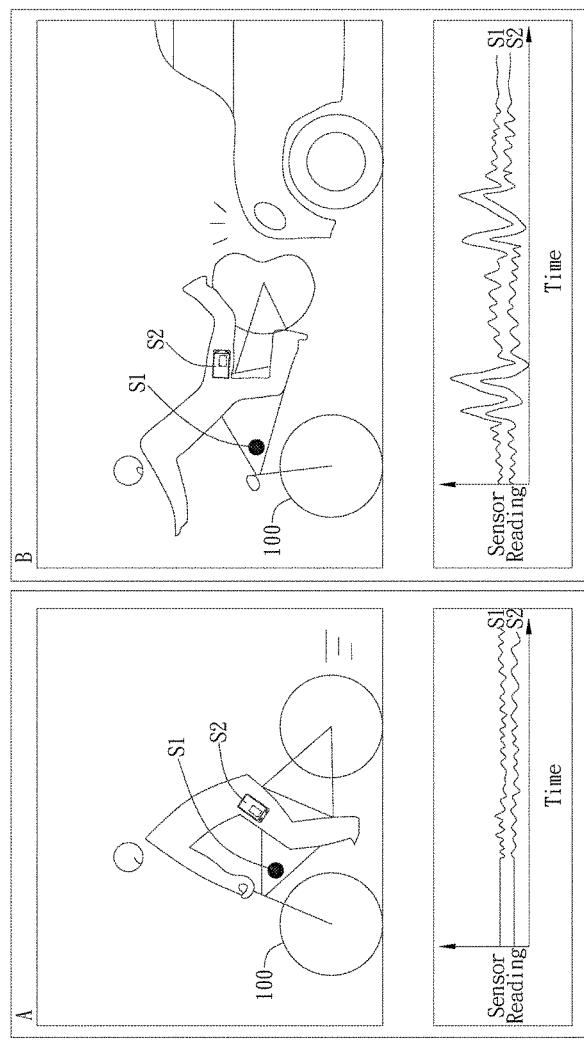

FALL DETECTION SYSTEM AND METHOD THEREOF

BACKGROUND

1. Technical Field

The present disclosure generally relates to a fall detection system and method thereof for detection of fall events off mobility vehicles; particularly, the present disclosure relates to a fall detection system and method thereof with dual sensors for detection of falls off mobility vehicles.

2. Description of the Related Art

As traffic congestion and rising pollution have become a concern for society, personal mobility vehicles have steadily gained attention by the consumers as a legitimate alternative transportation method since personal mobility vehicles are light, compact, and easy to navigate through traffic However, there is greater risk to injury when operating personal mobility vehicles since personal mobility vehicles are more susceptible to road conditions and operators may inadvertently fall off the personal mobility vehicles due to those susceptible circumstances.

SUMMARY

It is an objective of the present disclosure to provide a fall detection system and method thereof for detecting falls off a mobility vehicle.

It is another objective of the present disclosure to provide a fall detection system and method thereof for signaling for assistance when falls off a mobility vehicle are detected.

According to one aspect of the invention, a fall detection system for detecting falls of a mobility vehicle is provided. The fall detection system includes a first sensor, a second sensor, and a processor. The first sensor is disposed on the mobility vehicle and generates a first sensor reading corresponding to movement of the mobility vehicle. The second sensor is disposed in a mobile device and generates a second sensor reading corresponding to movement of the mobile device. The processor is disposed in the mobility vehicle or the mobile device, wherein the processor performs the following: a) retrieving the first sensor reading and the second sensor reading; b) determining a correlation between the first sensor reading and the second sensor reading and entering into a first mode if the correlation exceeds a minimum correlation threshold, otherwise repeating step a) after a first time period if the correlation is below the minimum correlation threshold; c) determining the correlation between the first sensor reading and the second sensor reading after a second time period, and entering into a second mode if the correlation is below the minimum correlation threshold; d) generating a fall detected signal if the correlation between the first sensor reading and the second sensor reading after a third time period correspond respectively to stationary movement of the mobility vehicle and the mobile device.

According to another aspect of the invention, a fall detection method is provided for detecting falls off a mobility vehicle. The method includes: a) detecting, by a first sensor installed on the mobility vehicle, a first sensor reading corresponding to movement of the mobility vehicle; b) detecting, by a second sensor installed in a mobile device, a second sensor reading corresponding to movement of the mobile device; c) determining, by a processor in the mobility vehicle or the mobile device, a correlation between the first sensor reading and the second sensor reading and entering into a first mode if the correlation exceeds a minimum correlation threshold, otherwise repeating from step a) after a first time period if the correlation is below the minimum correlation threshold; d) determining, by the processor, the correlation between the first sensor reading and the second sensor reading after a second time period, and entering into a second mode if the correlation is below the minimum correlation threshold; e) generating a fall detected signal, by the processor, if the correlation between the first sensor reading and the second sensor reading after a third time period correspond respectively to stationary movement of the mobility vehicle and the mobile device.

BRIEF DESCRIPTION OF THE DRAWINGS

FIG. 3A is an embodiment of the fall detection system in a first mode;

FIG. 3B is an embodiment of the fall detection system in the first mode transitioning to a second mode;

DETAILED DESCRIPTION OF THE PREFERRED EMBODIMENT

Embodiments of the present invention provide methods and systems for fall detection through use of two or more sensors. In the following detailed description, references are made to the accompanying drawings that form a part hereof, and in which are shown by way of illustration specific embodiments or examples. These embodiments are only illustrative of the scope of the present invention, and should not be construed as a restriction on the present invention. Referring now the drawings, in which like numerals represent like elements through the several figures, aspects of the present invention and the exemplary operating environment will be described.

The present disclosure provides a fall detection system and fall detection method thereof for detecting falls off a mobility vehicle. Preferably, the fall detection system and fall detection method may be applicable to motorized or non-motorized personal transportation vehicles, including (but not limited to) bikes, bicycles, tricycles, unicycles, scooters, skateboards, and other related vehicles.

Figure 1:
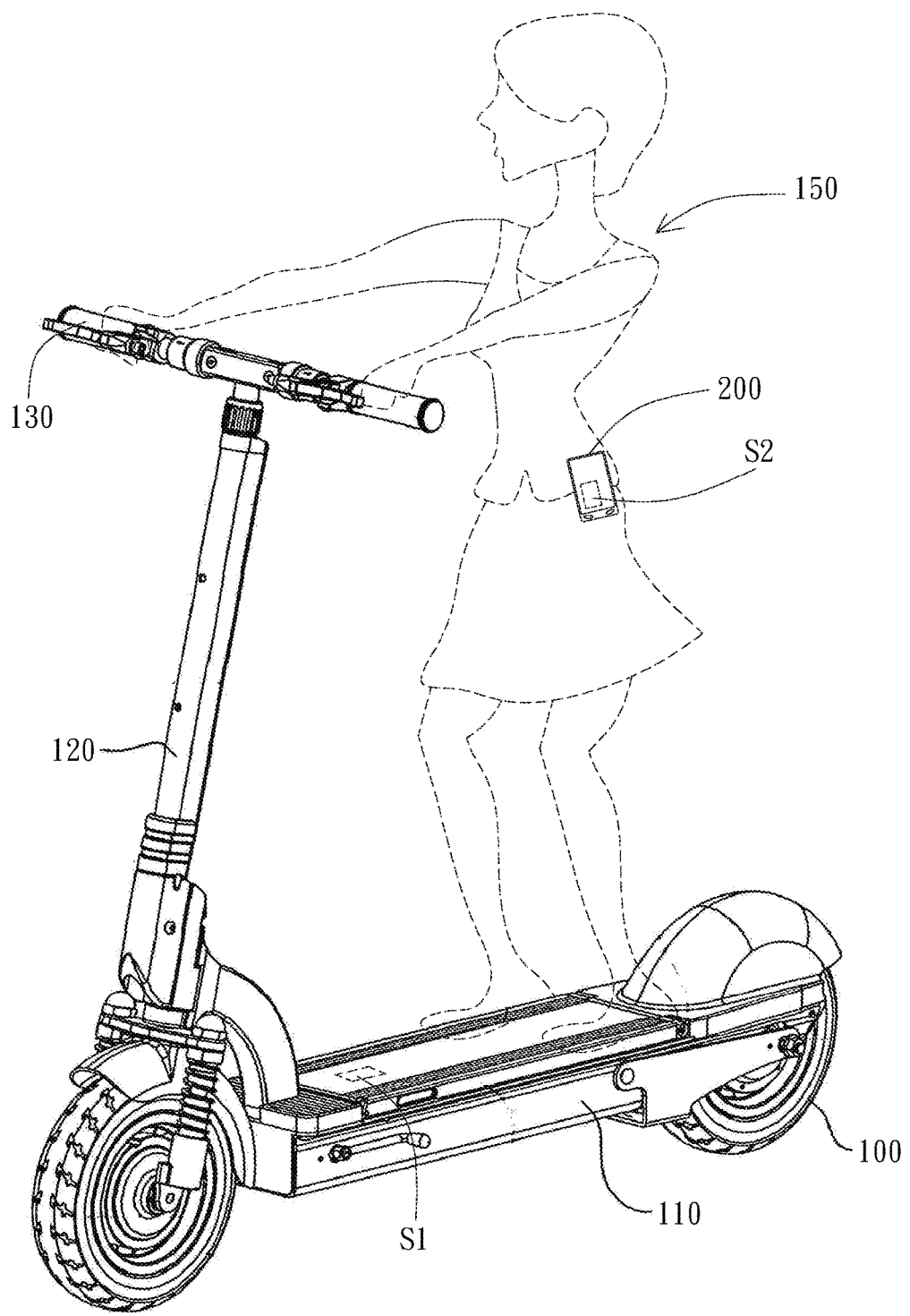
FIG. 1 is a view of an embodiment of the fall detection system of the present invention.

FIG. 1 is an embodiment of the fall detection system of the present invention for detecting falls off a mobility vehicle 100. The fall detection system includes a first sensor S1, a second sensor S2, and a processor (not shown) that may be installed on a mobile device 200 or the mobility vehicle 100.

In the present embodiment, the mobility vehicle 100 is shown as a scooter; however, the mobility vehicle 100 is not restricted or limited to being a scooter. In other different embodiments, the mobility vehicle 100 may be a motorized or non-motorized transportation device. For instance, the mobility vehicle may be a motorcycle, bicycle, motorized longboards or skateboards, or any other related personal or compact transportation vehicle.

As illustrated in FIG. 1, the first sensor S1 is disposed or installed on the mobility vehicle 100, while the second sensor S2 is disposed on the mobile device 200. In the present embodiment, the mobile device 200 may be a handheld phone; however, the mobile device 200 is not restricted or limited to being a handheld phone. In other different embodiments, the mobile device 200 may be a personal fitness tracker, a music player, an action camera, or any other compact handheld or wearable electronic device. For instance, the mobile device 200 may also include headsets, watches, straps, or electronic ankle laces or necklaces.

In the present embodiment, the first sensor S1 and the second sensor S2 are accelerometer sensors that respectively measure the movement or acceleration of the mobility vehicle 100 and the mobile device 200. However, in other different embodiments, the first sensor S1 and/or the second sensor S2 may be other types of sensors. For instance, the first sensor S1 and/or the second sensor S2 can also be a location sensor or a Global Positioning System sensor.

As illustrated in FIG. 1, the first sensor S1 is disposed on the deck 110 of the mobility vehicle 100. However, in other different embodiments, the first sensor S1 may alternatively be disposed on any other part of the mobility vehicle. For instance, the first sensor S1 may be disposed on a handlebar stem 120 or handlebar 130.

In one embodiment of the present invention, the first sensor S1 and the second sensor S2 may also include or be integrated with communication capabilities. For instance, the first sensor S1 may have wireless communication capabilities, either through itself or through a circuit board in the mobility vehicle 100, to wirelessly communicate with the second sensor S2 or the mobile device 200. For instance, when an operator 150 is carrying the mobile device 200 having the second sensor S2 and is in close proximity to the mobility vehicle 100, such as standing on the deck 110 of the mobility vehicle 100, the first sensor S1 and the second sensor S2 maybe communicate their signals wirelessly to the mobile device 200 (or to a circuit board in the deck 110).

Figure 2A:
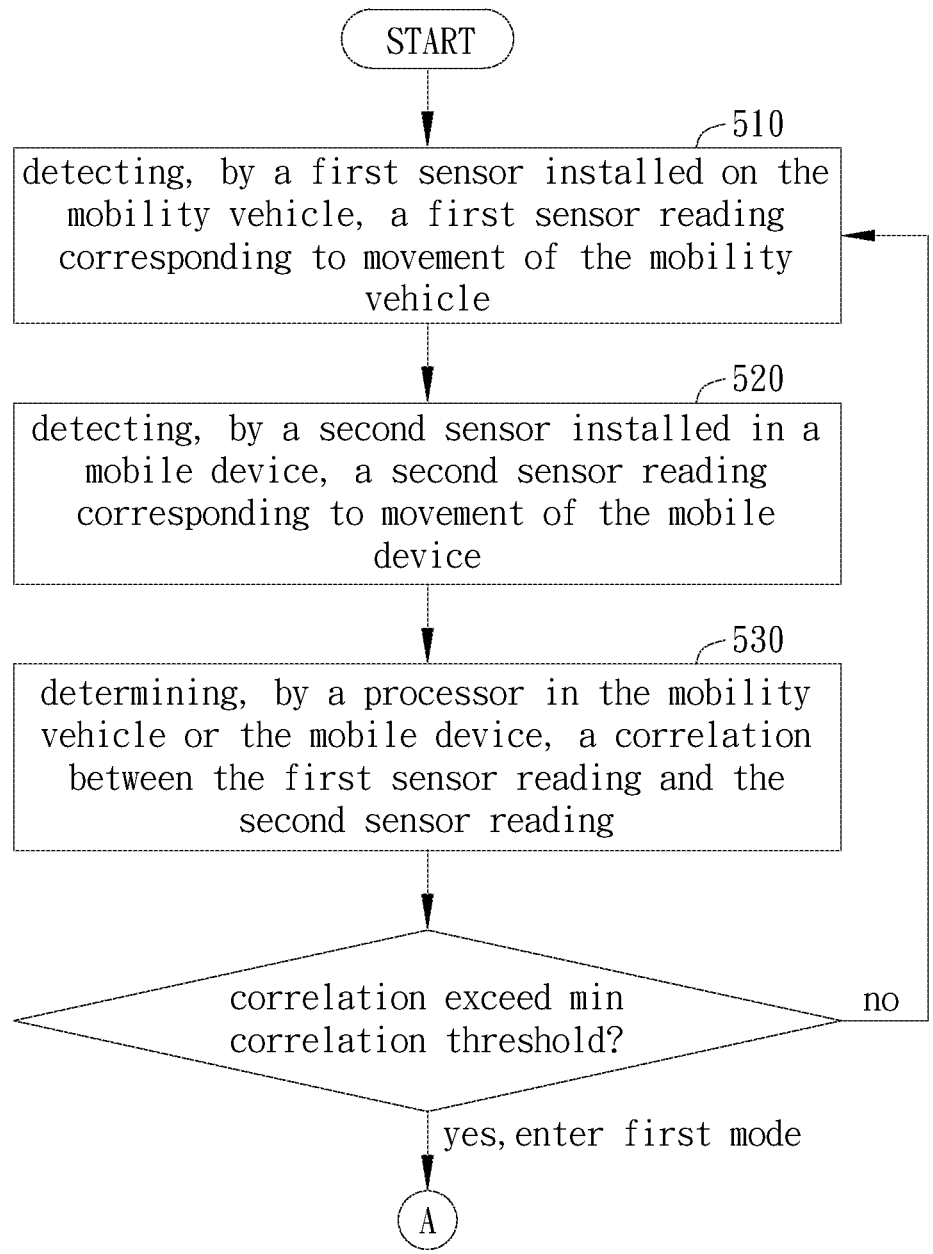
FIG. 2A is a first part of a flowchart of the fall detection method of present invention.
Figure 2B:
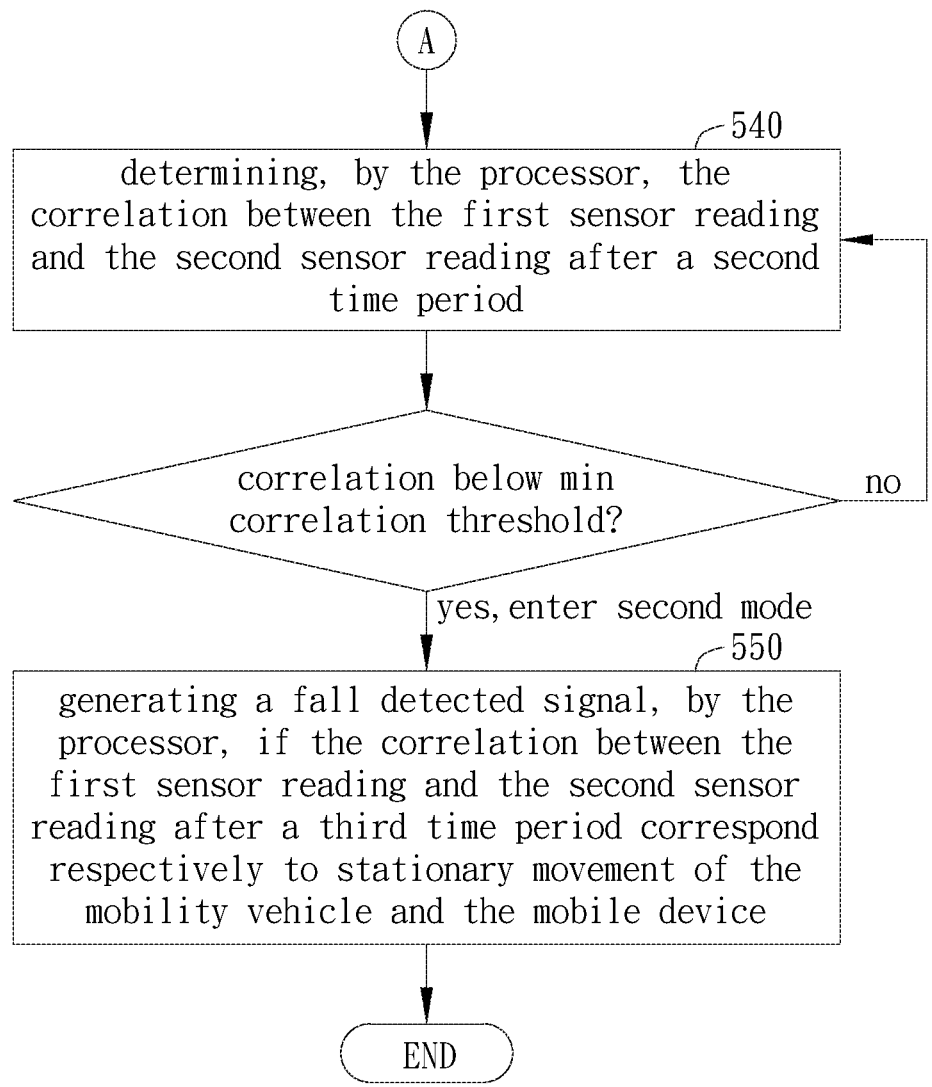
FIG. 2B is a second part of the flowchart of FIG. 2A.

Referring to FIGS. 2A-2B of a flowchart of the fall detection method of the present invention, the method includes steps 510~550. The following describes in greater detail the fall detection method of the present invention:

Step 510 includes detecting, by the first sensor S1 installed on the mobility vehicle 100, a first sensor reading corresponding to movement of the mobility vehicle 100. In the present embodiment, the first sensor S1 detects movement of the mobility vehicle 100 and generates the corresponding first sensor reading. For instance, if the first sensor S1 is an accelerometer sensor, the first sensor S1 will detect acceleration or G-forces of the mobility vehicle 100. In one instance, the first sensor S1 can include one, two, or three-axis accelerometers.

Step 520 includes detecting, by the second sensor S2 installed in the mobile device 200, a second sensor reading corresponding to movement of the mobile device 200. In similar fashion to the first sensor S1, the second sensor S2 detects movement of the mobile device 200 and will generate the corresponding second sensor reading. As an exemplary illustration, as shown in FIG. 1, when the mobile device 200 is on the operator 150, as the operator 150 moves, the second sensor S2 in the mobile device 200 will detect that movement and generate the second sensor reading.

For instance, as illustrated in FIG. 3A, the first sensor S1 and the second sensor S2 may not return any substantial sensor readings in the beginning when the first sensor S1 (attached to the mobility vehicle 100) and the second sensor S2 (attached to the mobile device 200 of the operator 150) is stationary. Once the operator 150 and the mobility vehicle 100 start to move, the first sensor S1 and the second sensor S2 will respectively sense the movement in the mobility vehicle 100 and the operator 150, and subsequently start outputting corresponding sensor readings.

Step 530 includes determining, by a processor in the mobility vehicle 100 or the mobile device 200, a correlation between the first sensor reading and the second sensor reading and entering a first mode if the correlation exceeds a minimum correlation threshold. In the present embodiment, the mobile device 200 and/or the mobility vehicle 100 may have a data processor that can compare the first sensor reading and the second sensor reading. This comparison may be performed by the processor of the mobile device 200 or the processor of the mobility vehicle 100. In other instances, both the processors of the mobile device 200 and the mobility vehicle 100 may be utilized to cooperatively perform data processing functions.

For exemplarily purposes, in the present embodiment, the mobile device 200 will perform the comparisons between the first sensor reading and the second sensor reading. The mobile device 200 is wirelessly coupled to the first sensor S1 on the mobility vehicle 100. For instance, the mobile device 200 may be wirelessly coupled to the first sensor S1 by means of Bluetooth technology, WIFI, or any other wireless technology. The mobile device 200 will read in the first sensor reading and the second sensor reading to determine if there are any correlations between them.

Figure 3C:
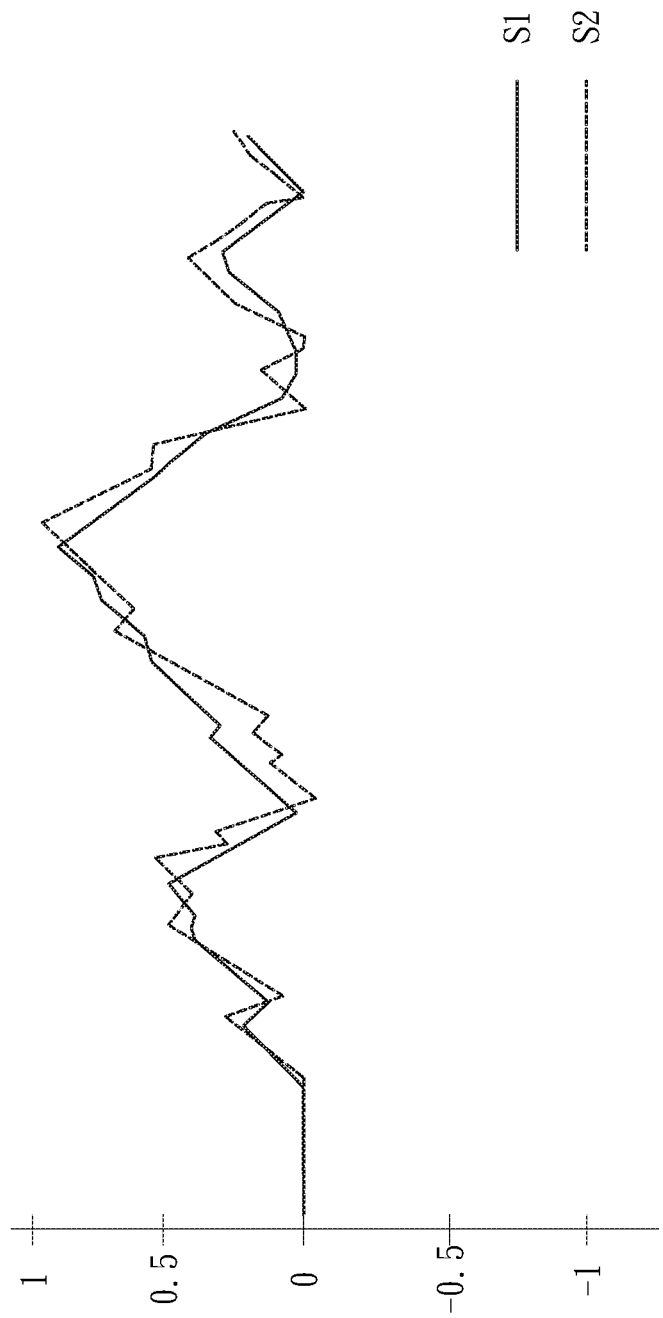
FIG. 3C is a view of an embodiment of the sensor readings of the present invention.

As illustrated in FIG. 3A, when the first sensor S1 and the second sensor S2 detect motion or movement, the first sensor S1 and the second sensor S2 will start to output sensor readings. However, at this point in time, the correlation between the first sensor reading and the second sensor reading is still unknown. The processor connected to the first sensor S1 or the second sensor S2 will receive the first sensor reading and the second sensor reading to determine if they are substantially synchronized with respect to each other. Referring to FIG. 3C, FIG. 3C exemplarily illustrates an embodiment of the first sensor reading and second sensor reading being plotted on the same chart. The first sensor reading and the second sensor reading respectively correspond to the movements detected by the first sensor S1 and the second sensor S2 of the mobility vehicle 100 and the mobile device 200. If after performing the comparisons a substantial similarity or correlation is found in the movements detected in the first sensor reading and the second sensor reading, the processor of the mobile device 200 will determine that the first sensor reading and the second sensor reading are correlated with respect to each other. In other words, the mobile device 200 will have determined or concluded that the first sensor reading and the second sensor reading are substantially synchronized with respect to each other.

For instance, if the operator 150 were to be standing on the mobility vehicle 100 while the mobility vehicle 100 was in motion, the first sensor reading of the first sensor S1 on the mobility vehicle 100 would be similar or substantially synchronized with the second sensor reading of the second sensor S2 in the mobile device 200.

In one instance, the correlation calculated by the mobile device 200 will fall in the range of $0 < x \leq 1$, wherein a correlation of 1 means the first sensor S1 and the second sensor S2 are perfectly in sync. In the present embodiment, there is a minimum correlation threshold stored in the mobile device 200. This minimum correlation threshold is a threshold number that the mobile device 200 compares to the correlation (calculated from comparing the first sensor reading and the second sensor reading) in order to determine if the correlation between the first sensor reading and the second sensor reading is enough such that the movements of the mobility vehicle 100 and the mobile device 200 can be considered to be in sync. For instance, if the minimum correlation threshold is exemplarily set to 0.75, the correlation calculated between the first sensor reading and the second sensor reading would have to exceed the minimum correlation threshold of 0.75 in order for the movements between the mobility vehicle 100 and the mobile device 200 to be considered to be substantially in sync.

Referring back to FIG. 3A, if the correlation is found to exceed the minimum correlation threshold, the fall detection system of the present invention will enter into a first mode. In the present embodiment, the first mode means that it has been determined that movement of the operator 150 (carrying the mobile device 200) is substantially in sync with the mobility vehicle 100. In other words, the first mode means that the operator 150 is riding on the mobility vehicle 100.

On the other hand, if the correlation is found to be below the minimum correlation threshold, the mobile device 200 would conclude that the movements of the mobile device 200 and the mobility vehicle 100 are not generally moving in the same direction. In other words, the mobile device 200 would determine that the operator 150 may have possibly stepped off the mobility vehicle 100. In this scenario, the fall detection system of the present invention would not enter into the first mode. Instead, the fall detection system would, after a first time period, read in new first sensor reading and second sensor reading from the first sensor S1 and the second sensor S2 in order to restart the process of determining whether the operator 150 was indeed riding in motion on the mobility vehicle 100. In other words, the fall detection system will not enter into the first mode unless it has determined that the operator 150 is riding in motion with the mobility vehicle 100.

Step 540 includes determining, by the processor, the correlation between the first sensor reading and the second sensor reading after a second time period, and entering into a second mode if the correlation is below the minimum correlation threshold. In the present embodiment, in step of 540, it is assumed that the fall detection system is already in the first mode. Once the fall detection system is in the first mode after step 530, the processor in the mobile device 200 will once again read in new first sensor reading and second sensor reading from the first sensor S1 and the second sensor S2.

By once again calculating the correlation between the new first sensor reading and second sensor reading and comparing the result to the minimum correlation threshold, the fall detection system can determine whether or not the movements of the first sensor S1 (on the operator 150) are generally or substantially synchronized with the second sensor S2 (on the mobility vehicle 100). If the correlation exceeds the minimum correlation threshold, then the operator 150 is still in sync with the mobility vehicle 100 and the fall detection system remains in the first mode, wherein step 540 is then subsequently repeated after another second time period.

However, as illustrated in FIG. 3B, the operator 150 may have started to fall off the mobility vehicle 100. In this situation, the first sensor reading from the first sensor S1 will start to differ from the second sensor reading from the second sensor S2 since the first sensor S1 (mobility vehicle 100) would start to travel in a different direction in comparison to the second sensor S2 (operator 150). When the processor compares the first sensor reading to the second sensor reading, the processor may find that the correlation is below the minimum correlation threshold, and subsequently determine or conclude that the movement of the operator 150 is not in sync with the mobility vehicle 100. In other words, the operator 150 may have possibly fallen off of the mobility vehicle 100 since the movement of the operator 150 (carrying the mobile device 200) is not substantially synchronized with the mobility vehicle 100.

In the present embodiment, after the mobile device 200 has determined the correlation is below the minimum correlation threshold, the fall detection system will enter into a second mode. The second mode means that the fall detection system has potentially detected a fall by the operator 150 off of the mobility vehicle 100. Once in the second mode, the fall detection system will then perform step 550.

Figure 4A:
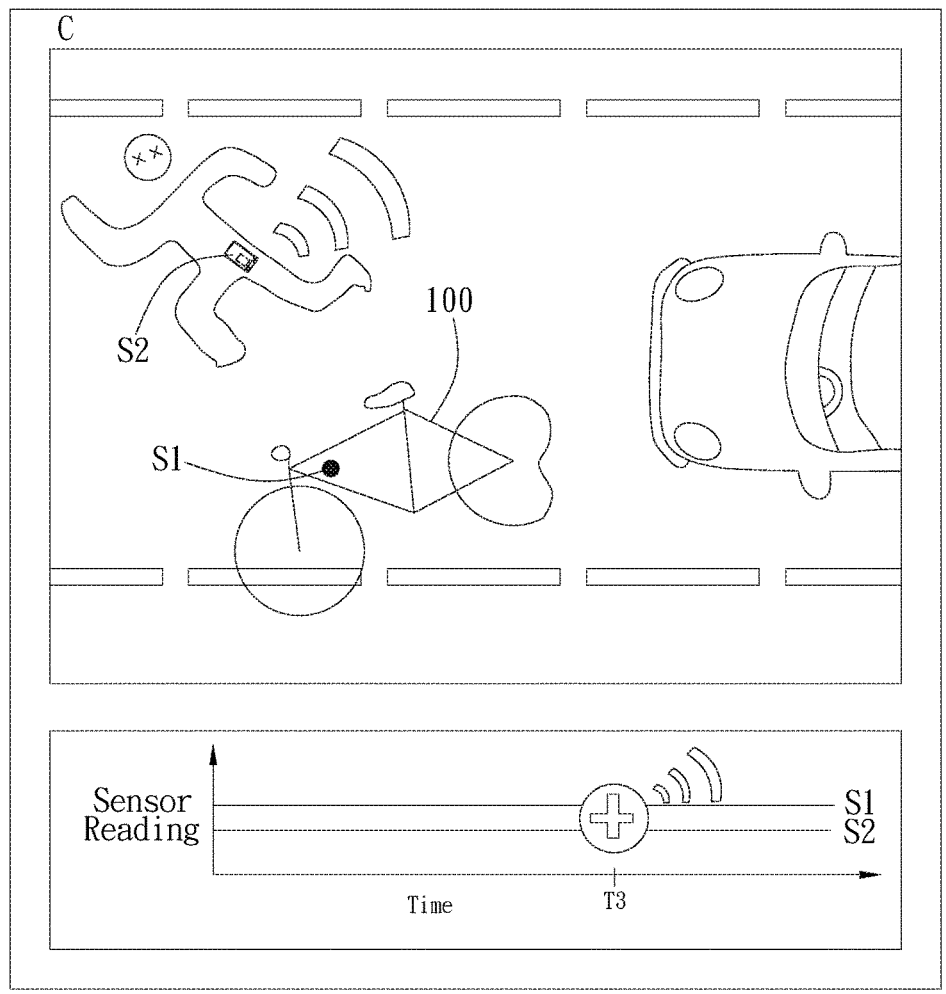
FIG. 4A is an embodiment of the fall detection system in a third mode.

Step 550 includes generating a fall detection signal, by the processor, if the correlation between the first sensor reading and the second sensor reading after a third time period correspond respectively to stationary movement of the mobility vehicle 100 and the mobile device 200. In the present embodiment, if the mobility vehicle 100 and the mobile device 200 are stationary as exemplarily illustrated in FIG. 4A, their respective first sensor S1 and second sensor S2 would return a first sensor reading and a second sensor reading that would indicate that the mobility vehicle 100 and the mobile device 200 are stationary. This can be accomplished by returning a value of zero for the first sensor reading and the second sensor reading, or the first sensor S1 and the second sensor S2 may return any other value or signal to indicate to the fall detection system that the mobility vehicle 100 and the mobile device 200 are stationary.

In the present embodiment, when the mobile device 200 reads in the first sensor reading and the second sensor reading and discovers that both of the readings have values of zero, the mobile device 200 will conclude that the mobility vehicle 100 and the mobile device 200 are both stationary. This would indicate that after falling off of the mobility vehicle 100, both the operator 150 (carrying the mobile device 200) and the mobility vehicle 100 are stationary in motion. The fall detection system will wait for a third time period T3 to see if the first sensor reading and/or the second sensor reading changes. If neither readings change, the fall detection system will generate a fall detected signal to drive the mobile device 200 to call for assistance. For instance, the fall detected signal may be utilized to drive the mobile device 200 to dial for medical assistance or to automatically notify a predetermined person of the fall event with corresponding location information. In other embodiments, the fall detection system can just focus on checking to see whether the second sensor reading changes after waiting for the third time period T3 since the fall detection system is primarily concerned with determining whether the operator 150 is responsive after falling off the mobility vehicle 100.

Figure 4B:
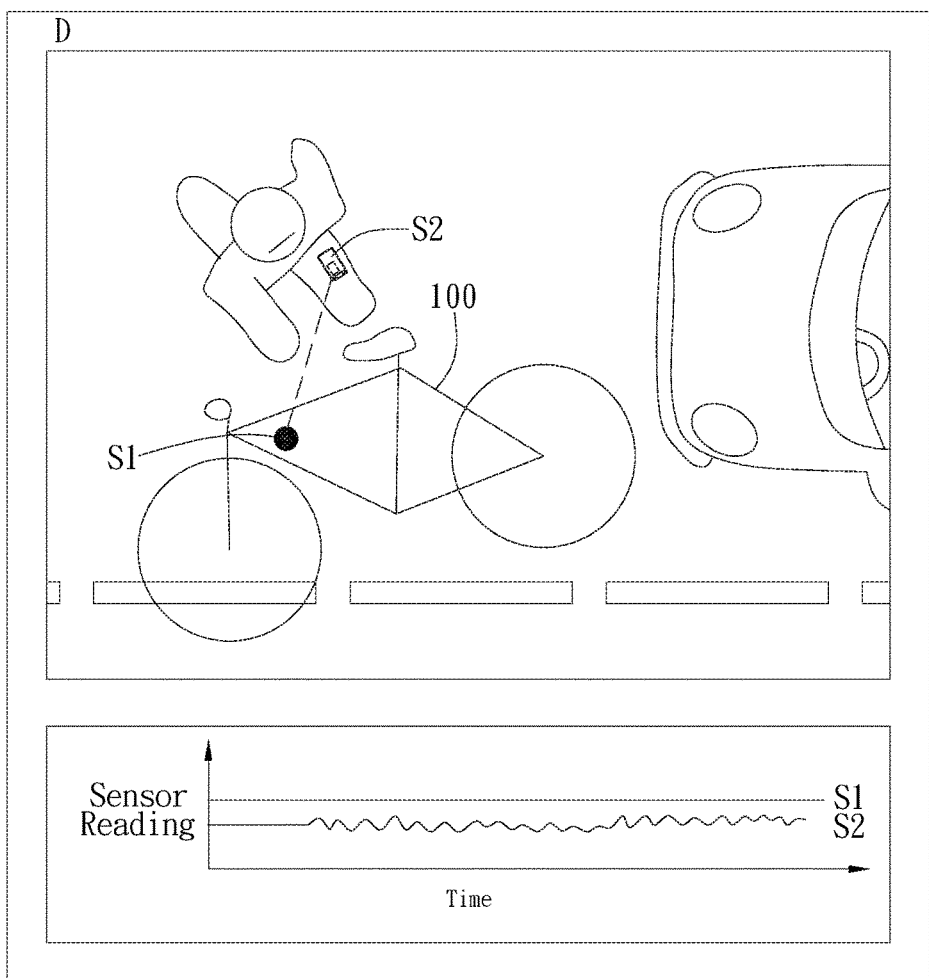
FIG. 4B is an embodiment of the fall detection system aborting the second mode.

However, as shown in FIG. 4B, if after falling off of the mobility vehicle 100 the operator 150 starts to move again (ie. the first sensor S1 remains stationary, but the second sensor S2 starts to move again), the processor of the fall detection system will determine or conclude that the operator 150 is fine and will cancel the call for assistance.

In other words, in this case, the processor might consider it to mean that the injury sustained by the operator 150 is minor, or the mobility vehicle 100 is skidding. It may also mean that someone else has picked up the mobile device 200. In these circumstances, the processor(s) in the mobility vehicle 100 and/or the mobile device 200 should still be able to log the incident in memory. The call for assistance can be delayed a particular period of time to ensure the operator 150 has time to perform a sequence to cancel the call for assistance. For example, the call for assistance may be delayed by 10-15 mins until the operator 150 enters a code to stop the action. In this manner, the mobile device 200 can be prevented from being operated by a random passerby (and subsequently cancel the call for assistance) while the operator 150 was still down.

Figure 4C:
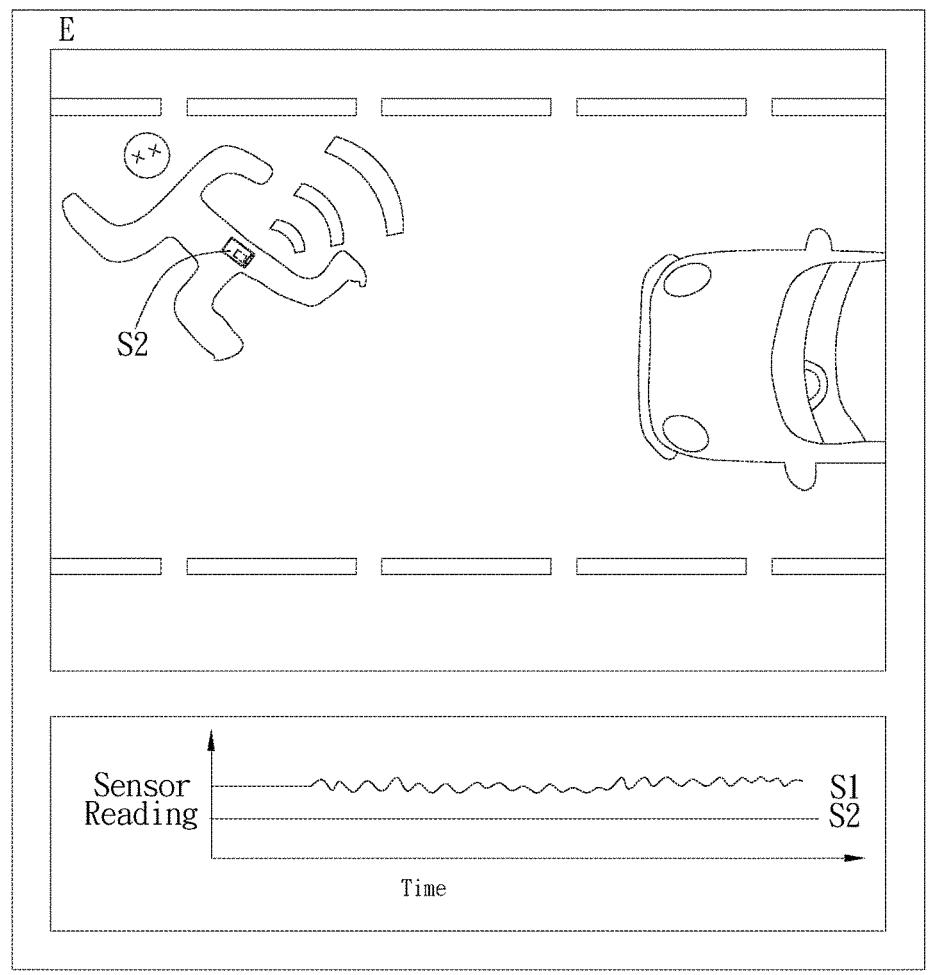
FIG. 4C is another embodiment of FIG. 4B.

Referring to FIG. 4C, in another embodiment, if after falling off of the mobility vehicle 100 the operator 150 remains motionless (ie. second sensor S2 remains stationary) but the mobility vehicle 100 (first sensor S1) moves away and possibly out of signal range of the second sensor S2, the processor of the fall detection system may conclude that there is: 1) a hit-and-run accident, wherein the mobility vehicle 100 is being dragged away by the hit-and-run vehicle; or 2) theft of the mobility vehicle 100 while the operator 150 is down. In either of these cases, the operator 150 (second sensor 2) remains motionless and therefore the fall detection system should call for assistance. However, in another embodiment, the fall detection system may also additionally transmit the location of the operator 150 (second sensor S2) along with the call for assistance or distress signal. In other different embodiments, if the mobility vehicle 100 is a powered personal transportation device such as an electric scooter, the processor of the fall detection system may enable a remote kill-switch on the mobility vehicle 100 or provide a tracking function on the whereabouts of the mobility vehicle 100 after the fall incident.

It should be noted that although the fall detection system of the present invention has been described in relation to two sensors disposed respectively on two different devices, it should be obvious to one in the art to realize that multiple sensors may be disposed on each of the different devices and cooperatively work together to allow better determination of the fall events mentioned above.

Although the embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A fall detection system for detecting falls off a mobility vehicle, comprising: a first sensor disposed on the mobility vehicle and generating a first sensor reading corresponding to movement of the mobility vehicle; a second sensor disposed in a mobile device and generating a second sensor reading corresponding to movement of the mobile device; a processor disposed in the mobility vehicle or the mobile device, wherein the processor performs the following: a) retrieving the first sensor reading and the second sensor reading; b) determining a correlation between the first sensor reading and the second sensor reading and entering into a first mode if the correlation exceeds a minimum correlation threshold, otherwise repeating step a) after a first time period if the correlation is below the minimum correlation threshold range; c) determining the correlation between the first sensor reading and the second sensor reading after a second time period, and entering into a second mode if the correlation is below the minimum correlation threshold; d) generating a fall detected signal if the correlation between the first sensor reading and the second sensor reading after a third time period correspond respectively to stationary movement of the mobility vehicle and the mobile device.

2. The fall detection system of claim 1, wherein the first sensor and the second sensor are accelerometers.

3. The fall detection system of claim 2, wherein the first sensor and the second sensor are one, two, or three-axes accelerometers.

4. The fall detection system of claim 1, wherein the first time period, the second time period, and the third time period are expressed in milliseconds, seconds, minutes, and are pre-determined as default values in the fall detection system.

5. The fall detection system of claim 1, wherein the processor is a central processing unit of a circuitry in the mobile device or the mobility vehicle.

6. The fall detection system of claim 1, wherein the mobile device includes handheld phones, personal training devices, location trackers, digital music players.

7. The fall detection system of claim 1, wherein the mobility vehicle includes motorized or non-motorized one wheeled, two wheeled, three wheeled, or four wheeled transportation vehicles.

8. The fall detection system of claim 7, wherein the mobility vehicle includes unicycles, motorcycles, bicycles, tricycles, scooters, kick boards, skateboards, motorized skateboards or longboards.

9. The fall detection system of claim 1, wherein the correlation of stationary mobile device and mobility vehicle is equal to zero.

10. The fall detection system of claim 1, wherein the fall detected signal drives the mobile device to call for assistance.

11. A fall detection system, comprising: a first sensor generating a first sensor reading corresponding to movement of the first sensor; a second sensor generating a second sensor reading corresponding to movement of the second sensor; a processor connected to the first sensor or the second sensor, wherein the processor performs the following: a) retrieving the first sensor reading and the second sensor reading; b) determining a correlation between the first sensor reading and the second sensor reading and entering into a first mode if the correlation exceeds a minimum correlation threshold, otherwise repeating step a) after a first time period if the correlation is below the minimum correlation threshold range; c) determining the correlation between the first sensor reading and the second sensor reading after a second time period, and entering into a second mode if the correlation is below the minimum correlation threshold; d) generating a fall detected signal if the correlation between the first sensor reading and the second sensor reading after a third time period correspond respectively to stationary movement of the first sensor and the second sensor.

12. A fall detection system, comprising: a first sensor generating a first sensor reading corresponding to movement of the first sensor; a second sensor generating a second sensor reading corresponding to movement of the second sensor; a processor connected to the first sensor or the second sensor, wherein the processor performs the following: a) retrieving the first sensor reading and the second sensor reading; b) entering into a first mode if the first sensor reading and the second sensor reading are substantially synchronized, otherwise repeating step a) after a first time period; c) entering into a second mode if the first sensor reading and the second sensor reading after a second time period is substantially unsynchronized; d) generating a fall detected signal if the first sensor reading and the second sensor reading after a third time period correspond respectively to stationary movement of the first sensor and the second sensor.

13. A fall detection method for detecting falls off a mobility vehicle, comprising: a) detecting, by a first sensor installed on the mobility vehicle, a first sensor reading corresponding to movement of the mobility vehicle; b) detecting, by a second sensor installed in a mobile device, a second sensor reading corresponding to movement of the mobile device; c) determining, by a processor in the mobility vehicle or the mobile device, a correlation between the first sensor reading and the second sensor reading and entering into a first mode if the correlation exceeds a minimum correlation threshold, otherwise repeating from step a) after a first time period if the correlation is below the minimum correlation threshold; d) determining, by the processor, the correlation between the first sensor reading and the second sensor reading after a second time period, and entering into a second mode if the correlation is below the minimum correlation threshold; e) generating a fall detected signal, by the processor, if the correlation between the first sensor reading and the second sensor reading after a third time period correspond respectively to stationary movement of the mobility vehicle and the mobile device.

14. The fall detection method of claim 13, wherein step c) further comprising: receiving the first sensor reading and the second sensor reading in the processor via direct or wireless connection to the first sensor and the second sensor.

15. The fall detection method of claim 13, wherein the first sensor and the second sensor are accelerometers, the step c) further comprising: determining the correlation between the first sensor reading and the second sensor reading as a value between $0<x<1$, wherein x is the correlation.

16. The fall detection method of claim 13, wherein step c) further comprising: communicably connecting, with the processor, to the first sensor and the second sensor by wire or wireless communication.

17. The fall detection method of claim 13, wherein the step d) further comprising: determining the level of synchronization of the first sensor reading and the second sensor reading to produce the correlation.

18. The fall detection method of claim 13, wherein the first sensor and the second sensor are accelerometers with three axes, step d) further comprising: determining highest signal component of the three axes of the first sensor reading to the highest signal component of the three axes of the second sensor reading; determining the level of synchronization of the first sensor reading and the second sensor reading to produce the correlation.

* * * * *